RING CHECKING CIRCUIT

Filed March 8, 1957 3 Sheets-Sheet 1

INVENTOR.
IRVING ABZUG

BY

Edwin Lester

ATTORNEY 3,017,620
RING CHECKING CIRCUIT

Irving Abzug, Poughkeepsie, N.Y., assignor to International Business Machines Corporation, New York, N.Y., a corporation of New York Filed Mar. 8, 1957, Ser. No. 644,784
8 Claims. (Cl. 340—248)

This invention relates to checking circuits and more particularly to an arrangement for checking the operation of a signal generator.

Signal generators of the ring circuit type are generally comprised of a plurality of stages cascaded together with each stage including a bistable device. The bistable device may comprise a vacuum tube or transistor trigger circuit having two stable states designated as the "on" or set state and the "off" or reset state. When the ring is called on to operate, the first stage may be so conditioned that the first ring advance pulse applied thereto causes the bistable device of the first stage to be set to the "on" state. When a ring advance pulse is next applied to the ring, the effect is to reset the bistable device of the first stage to the "off" state and to set the bistable device of the succeeding stage to the "on" state. In a similar manner, each succeeding ring advance pulse applied to the ring causes the bistable device that is presently in the "on" state to be reset to the "off" state and the next succeeding bistable device to be set to the "on" state so that the "on" state steps from bistable device to bistable device of the ring. Accordingly, though the "on" state steps from bistable device to bistable device of the ring, one and only one bistable device of the ring is in the "on" state at any one instant of time.

Occasionally, due to component breakdown or failures or power supply variation or noise signals creeping in, none or more than one of the bistable devices may be turned "on" or the ring may advance improperly (double-advance or other even multiple-advance) so that the wrong bistable device is turned "on." One form of ring checking circuit described in Patent No. 2,769,971 to Bashe, dated November 6, 1956, detects whether none or more than one of the plurality of bistable devices of a ring circuit is in the "on" state and includes a pair of "and" and "or" circuits corresponding to each bistable device in the ring except the first. This checking circuit though effective requires an additional pair of "and" and "or" circuits for each additional stage of the ring circuit. Another form of ring checking circuit described in Patent No. 2,724,104 to Wild, dated November 15, 1955, detects whether more than one of the plurality of bistable devices of a ring circuit is in the "on" state. This checking circuit is also effective but does not detect the condition wherein none of the triggers are turned "on." Additionally, both of the above arrangements fail to detect when the ring double-advances or otherwise advances improperly (multiple-advances). In double-advance and other multiple-advance situations, the ring advances just as if two drive signals (or several drive signals) were applied. Only one ring trigger will be "on" at any one time; the checking circuits of both Wild and Bashe fail to detect this error.

Accordingly, it is an object of the present invention to provide an improved checking arrangement.

Another object of the invention is to provide an improved arrangement for checking the operation of a signal generator.

Still another object of the invention is to check the operation of a signal generator with a minimum of circuitry.

A further object of the invention is to check whether a multi-stage ring circuit is operating properly.

A still further object of the invention is to check whether one and only one of a plurality of bistable devices has been switched from one stable state to the other.

Another object of the invention is to check the operation of a ring circuit to determine whether the ring circuit advances properly.

Still another object of the invention is to provide a ring checking circuit which detects ring circuit operation when the ring circuit should not be operating.

Another object of the invention is to provide a checking circuit for a ring of bistable devices which produces an error indication whenever none or more than one of the bistable devices of the ring has been turned "on" or whenever the ring advances improperly.

Other objects of the invention will be pointed out in the following description and claims and illustrated in the accompanying drawings which disclose by way of example, the principle of the invention and the best mode, which has been contemplated of applying that principle.

Figure 1:
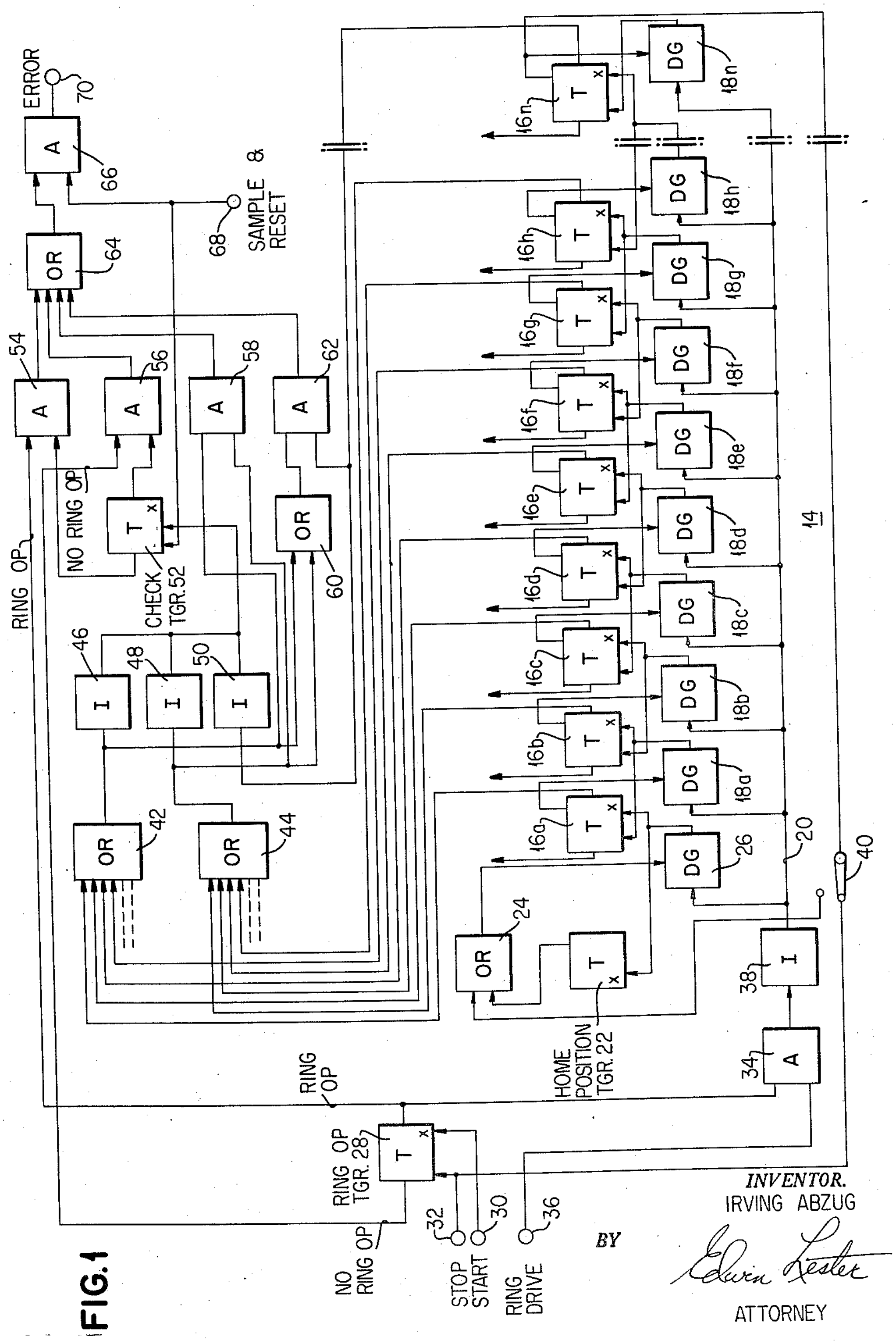
FIG. 1 is a block diagram of the checking circuit of the present invention.

Referring first to FIG. 1, there is illustrated, in block form, the arrangement for checking the operation of a multi-stage ring circuit. However, before proceeding to a description of the arrangement in FIG. 1, reference will be made to FIGS. 2 to 10, inclusive, which disclose, by way of example, the schematic circuits of the various blocks shown in FIG. 1.

*Symbol description*

Figures 2, 3, 4, 5, 6:
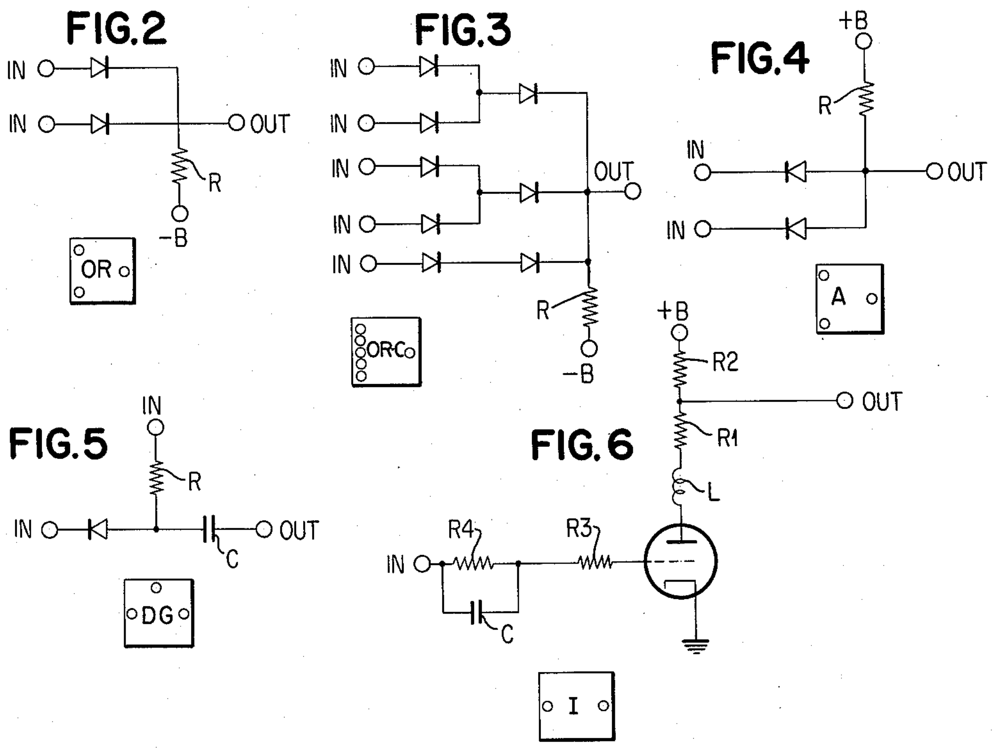
FIG. 2 shows both the block symbol and the schematic circuit of a positive "or" circuit OR used in the invention.
FIG. 3 shows both the block symbol and the schematic circuit of a cascaded "or" circuit OR–C used in the invention.
FIG. 4 illustrates both the block symbol and the schematic circuit of a positive "and" circuit A used in the invention.
FIG. 5 illustrates both the block symbol and the schematic circuit of a diode gate DG used in the invention.
FIG. 6 shows both the block symbol and the schematic circuit of an inverter I used in the invention.

Referring now to FIG. 2, there is illustrated the block symbol of a positive "or" circuit and also the details of the circuit within the block. A positive "or" circuit functions to isolate two or more positive input signals from each other and to produce a positive output signal in response to a positive input signal at any or all of the input terminals. The positive "or" circuit is composed of at least two diodes, the anodes of which are connected to the input terminals IN and the cathodes of which are connected to the output terminal OUT and via a common resistor R to a —B source. While only two input terminals have been shown in FIG. 2, it is to be understood that a positive "or" circuit may have any number of input terminals so long as a diode is provided between each input terminal and the output terminal. The back resistances of the diodes in an "or" circuit act as a load on the driving circuit and an increase in the number of diodes may produce an attendant loss of signal. Therefore, when the back resistance effects become excessive, it can be substantially reduced by cascading the diodes as shown by the arrangement in FIG. 3. The positive "or" circuit is represented in FIG. 1 by a block containing the designation OR while the cascaded "or" circuit is represented in FIG. 1 by a block containing the designation OR–C.

Referring now to FIG. 4, there is illustrated the block symbol of a positive "and" circuit and also the details of the circuit within the block. A positive "and" circuit functions to produce a positive output signal only when there is a coincidence of positive signals conditioning each of the input terminals thereof. It should be noted that the positive input signals are not necessarily applied simultaneously to the input terminals of the "and" circuit and, therefore, in instances where positive signals are applied to all but one of the input terminals thereof, the circuit is said to be conditioned so that when a positive signal is applied to the remaining input terminal, there is a coincidence of input signals causing the production of a positive output signal. A positive "and" circuit is composed of at least two diodes, the cathodes of which are connected to the input terminals IN and the anodes of which are connected to the output terminal OUT and via a common resistor R to a +B source. The positive "and" circuit is represented in FIG. 1 by a block containing the designation A.

Referring now to FIG. 5 there is illustrated a block symbol of a diode gate and also the details of the circuit within the block. A diode gate functions to produce a sharp negative output pulse or spike in response to a negative shift of potential at the signal input thereof. A diode gate is composed of a diode, the cathode of which is connected to a signal input terminal IN and the anode of which is connected via a capacitor C to the output terminal OUT and via a resistor R to a control input terminal IN. The control and signal input terminals are normally biased so that the diode is cut off and the output terminal is at a potential determined by the circuit to which it is connected. If a positive signal is applied to the control input terminal, the potential at the anode of the diode is raised to a more positive value then that at the cathode of the diode causing the diode to conduct and the gate is said to be conditioned. If a positive pulse is then applied to the signal input terminal, the positive shift of potential at the leading edge of the pulse raises the potential at the cathode of the diode to a more positive value than that existing at the anode of the diode causing the diode to be cut off. The potential at the anode of the diode then rises exponentially to approximately that value existing at the cathode of the diode whereupon the diode again conducts and the potential at the anode of the diode stops rising and is maintained at the value existing at the signal input terminal. Now, when the negative shift of potential at the trailing edge of the positive input pulse appears at the signal input terminal, it instantaneously appears at the anode of the diode as the resistance across the conducting diode is negligible and, further, since the potential across a capacitor cannot change instantaneously, the potential at the output terminal experiences the same instantaneous negative shift of potential and then rises rapidly to its quiescent value. Thus, it is apparent that if the diode gate is properly conditioned, that is, if a positive signal is first applied to the control input terminal, it will generate a sharp negative pulse or spike in response to a negative shift in potential at the signal input terminal. The diode gate is represented in FIG. 1 by a block containing the designation DG.

Referring now to FIG. 6, there is illustrated a block symbol of an inverter and also the details of the circuit within the block. An inverter functions to produce an output signal having substantially the same wave shape as the input signal but of opposite polarity and with no appreciable time difference between the input signal and the output signal. The inverter will also amplify the signals applied thereto and may comprise a triode having its plate connected serially via an inductor and a pair of resistors R1 and R2 to a +B source, its grid connected serially via a pair of grid resistors R3 and R4, with a capacitor C connected in parallel with R4, to the signal input terminal IN and its cathode connected to ground, while the junction of resistors R1 and R2 are connected to the output terminal OUT. The inverter is represented in FIG. 1 by a block containing the designation I.

Figure 7:
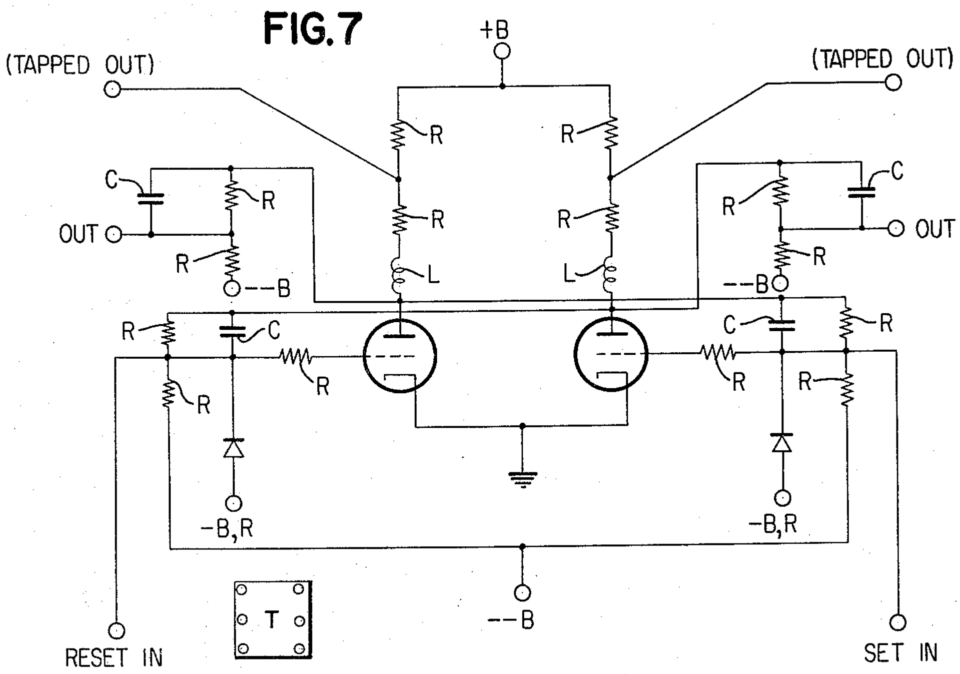
FIG. 7 shows both the block symbol and the schematic circuit of an electronic trigger T used in the invention.

Referring now to FIG. 7, there is illustrated a block symbol of a vacuum tube trigger and also the details of a circuit within the block. A trigger functions as a storage or control device inasmuch as it is a bistable device, that is, one that remains in either one of two stable states until it is forced or triggered by an input signal to assume the other state with each subsequent input signal being effective to turn the trigger to the opposite state. The trigger may comprise a cross coupled dual triode, that is, the plate of the right hand tube is resistively coupled via a voltage divider network to the grid of the left hand tube, while the plate of the left hand tube is resistively coupled via a voltage divider network to the grid of the right hand tube. Therefore, any changes in potential at the plates of the dual triode are coupled to the grids of the opposite tubes. One stable state of the trigger is termed the "off" state and exists when the right hand tube in the conductive state and the left hand tube is in a non-conductive state. In this state, the plate of the right hand tube is at a relatively negative potential while the plate of the left hand tube is a relatively positive potential. If a negative pulse or a negative shift of potential is applied to the set input terminal SET IN of the trigger, the right hand tube is forced or triggered to a non-conductive state with a resulting positive shift of potential occurring at the plate thereof. The positive shift of potential is coupled, via the voltage divider cross coupling, to the grid of the left hand tube so that the left hand tube is triggered to a conductive state with a resulting negative shift of potential occurring at the plate thereof. This is the other stable state of the trigger and is termed the "on" state. In a similar manner, when a trigger is in the "on" state, it may be triggered to the "off" state by the application of a negative pulse or a negative shift of potential to the reset input terminal RESET IN of the trigger. Outputs are tapped from the plate circuit resistance of both tubes and from other voltage divider networks connected to the plates of the dual triode. Consequently, upon setting the trigger to the "on" state, positive shifts of potential occur at the outputs associated with the right hand tube while negative shifts of potential occur at the outputs associated with left hand tube and vice-versa when the trigger is switched to the "off" state. Normally, the grids of the trigger are clamped via a diode to a −B source so that the potential at the grids do not fall below this value. However, if it is desired to initially have a trigger in the "on" state regardless of its previous state, a positive pulse is applied to the left hand −B, R terminal causing the left hand tube to conduct if it is not already conducting or to maintain the left hand tube conducting if it is already conducting. A similar arrangement is provided for the right hand tube if it is desired to initially have the trigger in the "off" state regardless of its previous state. The trigger is represented in FIG. 1 by a block containing the designation T.

Figures 8, 9, 10, 11, 12:
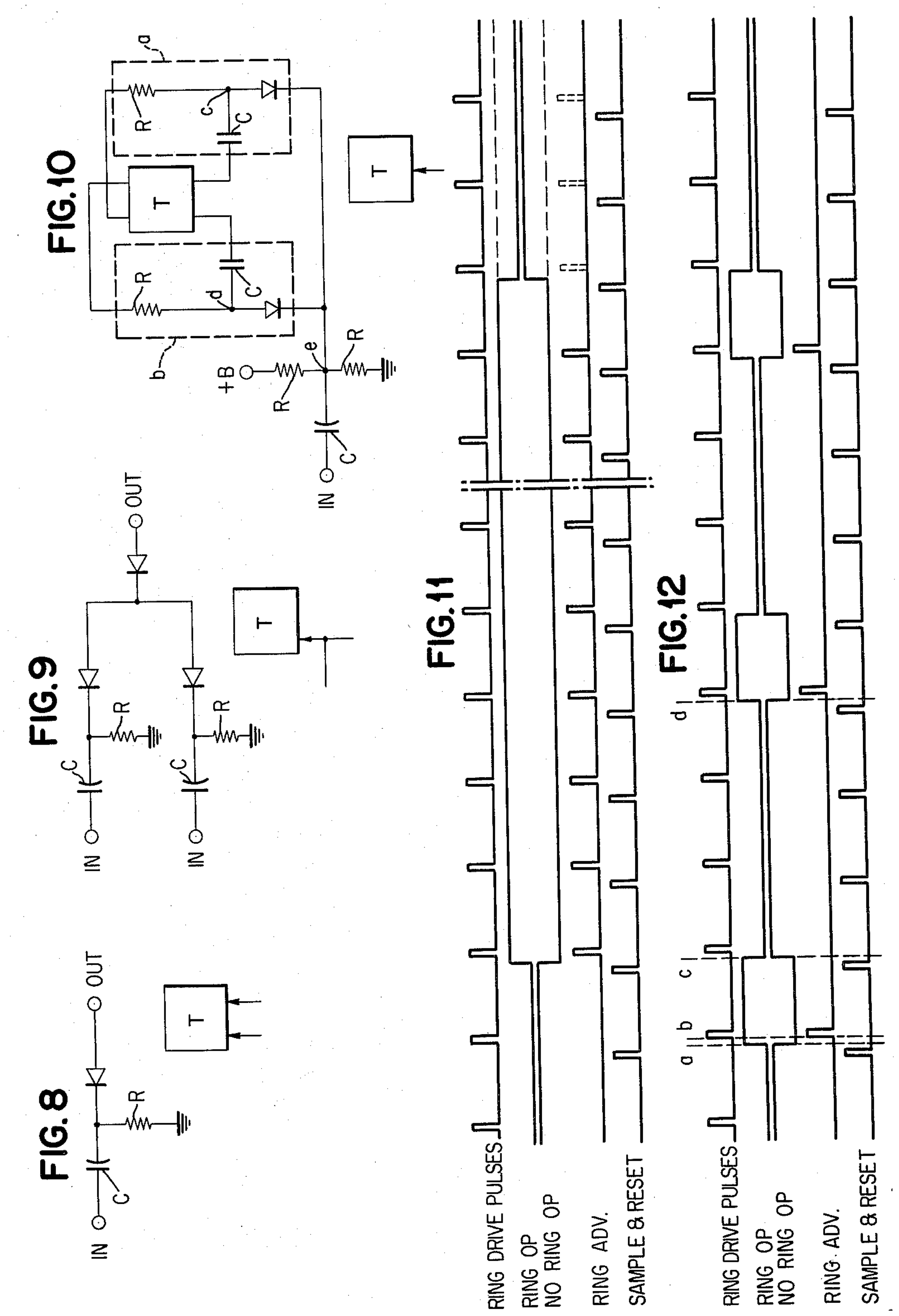
FIGS. 8, 9 and 10 illustrate both the symbol and schematic circuit of various trigger input circuits used in the invention.
FIGS. 11 and 12 are timing diagrams showing the signals applied at various points in FIG. 1.

A variety of input circuits which have been devised for the trigger are shown in FIGS. 8 to 10, inclusive.

Referring now to FIG. 8, there is illustrated a symbol of a negative shift input circuit and also the details of the circuit. A negative shift input circuit functions to pass a negative shift of potential to the input terminal of the trigger to which it is connected. Thus, if a negative shift input circuit is connected to the side of the trigger which is conducting, the negative shift of potential will lower the potential at the grid of this tube causing the tube to be cut off and the trigger to shift from its present state to its opposite state. A negative shift input circuit may be connected to either or both terminals of the trigger. The negative shift input circuit consists of differentiating circuit and an isolating diode. If a positive shift of potential is applied to the differentiating circuit, a sharp positive pulse occurs at the output thereof which is applied to the cathode of the isolating diode and is of such a magnitude as to maintain the isolating diode cut off thereby isolating the input terminal of the trigger from positive shifts of potential. However, if a negative shift of potential is applied to the differentiating circuit, a sharp negative pulse, occurring at the output thereof, is applied to the cathode of the isolating diode causing the diode to conduct and the anode then follows the drop of potential occurring at the cathode of the isolating diode. Since the input terminal of the trigger is connected to the anode of the isolating diode, then, if the input circuit is connected to the conductive side of the trigger, the drop in potential at the input terminal causes the tube to cut off and the trigger to shift from its present state to its opposite state. A negative shift input circuit is represented in FIG. 1 by a lead line entering the bottom left or right hand side of a trigger block.

More than one negative shift input circuit may be used at either or both input terminals of the trigger, the only restriction being that only one diode shall be connected to the input terminal of the trigger. Consequently, FIG. 9 shows a symbol of a multiple negative shift input circuit and also the details of the circuit.

Referring now to FIG. 10, there is illustrated a symbol of a self-gated binary input circuit and also the details of the circuit. A self-gated binary input circuit functions to allow a trigger to be shifted from one state to the other with each negative input pulse applied thereto regardless of its previous state. The self-gated binary input circuit consists of a differentiating circuit and two diode gates *a* and *b*. When the trigger is in the "off" state, the potential at the junction *c* is at a relatively high positive value while the potential at the junction *d* is at a somewhat lower positive value. At the same time, the potential at the junction *e* is approximately that at the junction *c* and when a negative shift of potential is applied to the self-gated binary input circuit, the potential at the junction *e* drops to a value which is somewhat higher than that at the junction *d*. Therefore, the diode associated with junction *d* cannot conduct inasmuch as its cathode is still positive with respect to its anode while the diode associated with junction *c* conducts and passes the negative shift of potential to the right hand input terminal of the trigger causing the right hand tube to be cut off and the trigger to shift to the "on" state. The conditions of the diode gates *a* and *b* are now reversed and the next pulse applied to the self-gated binary input circuit causes the trigger to shift back to the "off" state. In a similar manner each successive pulse applied to the input circuit causes the trigger to be shifted from its present state to the opposite state. A self-gated binary input circuit is represented in FIG. 1 by a lead line entering the bottom center of a trigger block.

In the description of the block symbols used in FIG. 1, no reference has been made to passive elements such as cathode followers, level setters and the like. It should be obvious that the characteristics of these elements vary and are largely determined not only by the component load but also by the length of conductors coupling one component to another. Therefore, in a specific embodiment of the circuit, in accordance with the principles of the present invention, passive elements may be used wherever and in any manner that is deemed necessary.

*Ring circuit description*

Referring now to FIG. 1, the ring circuit 14 consists of a plurality of stages, each including a trigger 16 and a diode gate 18 with the right hand tapped output of the trigger 16 being connected to the control input of the diode gate 18. The signal input of each of the diode gates 18 is connected to a ring advance line 20 while the output of each of the diode gates 18 is connected to the reset input of the associated trigger 16 and the set input of the next succeeding trigger 16 except the last diode gate 18 of the ring, the output of which is merely connected to the reset input of the associated trigger 16. The ring circuit 14 also includes a home position trigger 22, the right hand tapped output of which is coupled via an "or" circuit 24 to the control input of a diode gate 26. The signal input of the diode gate 26 is connected to the ring advance line 20 while the output of the diode gate 26 is connected to the reset input of the home position trigger 22 and the set input of the first trigger **16*a* of the ring circuit 14**.

A ring operate trigger 28 is provided for controlling the application of drive pulses to the ring circuit 14. The ring operate trigger 28 is connected to a source (not shown) which applies negative pulses via a START input terminal 30 and a STOP input terminal 32 to the set and reset inputs, respectively, of the ring operate trigger 28 to selectively start and stop the advance of the ring circuit 14 by turning the ring operate trigger "on" or "off" respectively. The right hand output of the ring operate trigger 28 is connected to one input of the drive "and" circuit 34, the other input of which is connected via a ring drive input terminal 36 to a ring drive source (not shown) which applies positive pulses at a rate determined by the source. The output of the drive "and" circuit 34 is coupled via an inverter 38 to the ring advance line 20. When ring circuit operation is called for, a negative pulse is applied to the START input terminal 30 causing the ring operate trigger 28 to be turned "on." The ring operate trigger 28 in being turned "on" applies a positive signal RING OP from its right hand output to condition the drive "and" circuit 34. Hence, the positive ring drive pulses applied to the input terminal 36 pass via the now conditioned drive "and" circuit 34 to the inverter 38 where they are inverted to negative pulses and applied to the ring advance line 20. When ring circuit operation is to be terminated, a negative pulse is applied to the STOP input terminal 32, causing the ring operate trigger 28 to be turned "off," which, in being turned "off," applies a negative signal from its right hand output to decondition the "and" circuit 34 and prevent any further ring drive pulses from passing through to the ring advance line 20.

Before proceeding to a description of the checking circuit, an explanation will now be given of the operation of the ring circuit 14. At the start of operation, let it be assumed that the trigger 16 of the ring circuit 14 and the ring operate trigger 28 have been reset to the "off" state and that the home position trigger 22 has been set to the "on" state. This initial state of the triggers is denoted by the small letter *x* adjacent the side at which the tube is conducting. Under the assumed condition of the home position trigger 22 being in the "on" state and the triggers 16 of the ring circuit 14 being in the "off" state, a positive signal is applied from the right hand tapped output of the home position trigger 22 via the "or" circuit 24 to condition the diode gate 26 while negative signals are applied from the right hand tapped outputs of the triggers 16 of the ring circuit 14 to decondition all of the associated diode gates 18.

Now, let it be assumed that ring circuit operation is called for so that a negative pulse is applied to the START input terminal 30 causing the ring operate trigger 28 to be turned "on" whereby a positive signal is applied via its right hand output to condition the drive "and" circuit 34. The next positive pulse applied to the ring drive input terminal 36 passes via the now conditioned "and" circuit 34 to the inverter 38 where it is inverted to a negative pulse and applied to the ring advance line 20. The first negative pulse on the ring advance line 20 passes via the conditioned diode gate 26 to turn "off" the home position trigger 22 and to turn "on" the first trigger **16*a* of the ring circuit 14. The home position trigger 22 in being turned "off" applies a negative signal from its right hand tapped output via the "or" circuit 24 to decondition the diode gate 26. The first trigger 16*a* of the ring circuit 14 in being turned "on" applies a positive signal from its right hand tapped output to condition the associated diode gate 18*a* while the remaining triggers 16*b* to 16*n* of the ring circuit 14** remain "off"

causing negative signals to be applied from their right hand tapped outputs to maintain their associated diode gates 18*b* to 18*n*, respectively, deconditioned. The second positive pulse applied to the ring drive input terminal 36 passes via the still conditioned "and" circuit 34 to the inverter 38 where it is inverted to a negative pulse and again applied to the ring advance line 20. Consequently, the second negative pulse on the ring advance line 20 passes via the now conditioned diode gate 18*a* and is effective to reset the first trigger 16*a* of the ring circuit 14 to the "off" state and to set the second trigger 16*b* of the ring circuit 14 to the "on" state. In a similar manner, each succeeding negative pulse applied to the ring advance line 20 steps the "on" state down the ring circuit 14.

A two position switch 40 is provided to permit the ring circuit 14 to operate either as a closed ring or an open ring. With the switch 40 in the position shown in FIG. 1, the ring circuit 1 will operate as an open ring. Thus, when the last trigger 16*n* of the ring circuit 14 is turned "on," a positive signal is applied from its right hand tapped output to condition the associated diode gate 18*n*. Consequently, the next negative pulse applied to the ring advance line 20 passes via the conditioned diode gate 18*n* to turn "off" the trigger 16*n*. The trigger 16*n* in being turned "off" applies a negative signal from its right hand tapped output via the switch 40 to turn "off" the ring operate trigger 28. The ring operate trigger 28 in being turned "off" applies a negative signal from its right hand output to decondition the "and" circuit 34 to prevent further ring drive pulses from passing through to the ring advance line 20. Thus, with the switch 40 in the one position, the ring circuit 14 operates as an open ring, going through only one cycle of operation each time the ring circuit 14 is called on to operate. When it is again desired to utilize the ring circuit 14, the home position trigger 22 is turned "on," prior to the ring operate trigger 28 being turned "on," which in being turned "on" applies a positive signal from its right hand output via the "or" circuit 24 to condition the diode gate 26 in preparation for the next operation of the ring circuit 14.

With the switch 40 in the other position, the right hand tapped output of the last trigger 16*n* is no longer connected to the reset input of the ring operate trigger 28 but rather via the "or" circuit 24 to the control input of the diode gate 26. Consequently, when the last trigger 16*n* of the ring circuit 14 is turned "on," a positive signal is applied from its right hand tapped output to condition the associated diode gate 18*n* and is also applied via the switch 40 and the "or" circuit 24 to condition the diode gate 26. Thus, when the next negative pulse is applied to the ring advance line 20, it passes via the diode gate 18*n* to turn "off" the last trigger 16*n* of the ring circuit 14 and also passes via the diode gate 26 to turn "on" the first trigger 16*a* of the ring circuit 14. The ring circuit 14 will now recycle in the same manner as previously explained and so long as the ring operate trigger 28 remains "on," the ring circuit 14 operates as a closed ring. When it is desired to stop the operation of the ring circuit 14, a negative pulse is applied to the STOP input terminal 32 causing the ring operate trigger 28 to be turned "off." The ring operate trigger 28 in being turned "off" applies a negative signal from its right hand output to decondition the "and" circuit 34 thereby preventing any further ring drive pulses from passing through to the ring advance line 20. When it is again desired to utilize the ring circuit 14, the home position trigger 22 is turned "on" and the triggers 16 are turned "off," prior to the ring operate trigger 28 being turned "on," which in being turned "on" applies a positive signal via the "or" circuit 24 to condition the diode gate 26 in preparation for the next operation of the ring circuit 14. FIG. 11 shows a timing diagram of the signals appearing at various points in FIG. 1 when the ring circuit 14 is operating as an open ring. Additionally, a timing diagram of the signals appearing at the same points in FIG. 1 when the ring circuit 14 is operating as a closed ring would be the same as for the open ring except for those signals shown in dotted outline.

The ring circuit 14, regardless of whether it is operating as a closed ring or an open ring, need not necessarily be advanced by successive ring drive pulses but rather by predetermined ones of them. This may be accomplished merely by selectively controlling the operation of the ring operate trigger 28. Thus, with reference being made to FIG. 12, let it be assumed that at time *a*, the ring operate trigger 28 is turned "on," by a negative signal applied to the START input terminal 30, to condition the "and" circuit 34 so that the first ring drive pulse applied to the input terminal 36, at time *b*, passes through to the ring advance line 20 to turn "on" the first trigger 16*a* of the ring circuit 14 while the remaining triggers 16*b* to 16*n* of the ring circuit 14 remain in the "off" state. Now, at time *c*, before the next ring drive pulse is applied to the input terminal 36, a negative signal is applied to the STOP input terminal 32 causing the ring operate trigger 28 to be turned "off" which, in being turned "off," applies a negative signal from its right hand output to decondition the "and" circuit 34 to prevent any further ring drive pulses from passing through to the ring advance line 20. At time *d*, after a predetermined number of ring drive pulses, the ring operate trigger 28 is again turned "on" to condition the "and" circuit 34 to permit a single ring drive pulse to pass through to the ring advance line 20 to advance the ring circuit 14 one position, after which, the ring operate trigger 28 is again turned "off." After another predetermined number of ring drive pulses the ring operate trigger 28 is again turned "on" to permit a single ring drive pulse to pass through to the ring advance line 20 to advance the ring circuit 14 to the next succeeding position. Thus, it is apparent that the ring circuit 14 may operate as a closed ring or an open ring responding to successive ring drive pulses or predetermined ones of the ring drive pulses.

*Checking circuit description*

The arrangement for checking the operation of a multistage ring circuit will now be described. The right hand outputs of all of the triggers of the ring circuit 14 except the *n*th trigger are connected to the "or" circuits 42 and 44 in such a manner that the odd ones of the triggers of the ring circuit 14, as for example, triggers 16*a*, 16*c*, 16*e* and 16*g* are monitored by the "or" circuit 42 while the even ones of the triggers of the ring circuit 14, as for example, triggers 16*b*, 16*d*, 16*f* and 16*h* are monitored by the "or" circuit 44. Consequently, a positive signal appears at the output of odd monitor "or" circuit 42 whenever an odd one of the triggers 16 of the ring circuit 14 is turned "on" while a positive signal is produced at the output of even monitor "or" circuit 44 whenever an even one of the triggers 16 of the ring circuit 14 is turned "on." The outputs of odd monitor "or" circuit 42 and even monitor "or" circuit 44 are applied to monitor inverters 46 and 48, respectively, while the right hand output of the *n*th trigger of the ring circuit 14 is connected to monitor inverter 50. The outputs of the monitor inverters 46, 48 and 50 are commonly coupled to the binary input of a check trigger 52. Hence, a positive signal from the odd monitor "or" circuit 42 or the even monitor "or" circuit 44 or from the *n*th trigger of the ring circuit 14 is inverted to a negative signal and applied to switch the state of the check trigger 52. The left hand output of the check trigger 52 and the right hand output of the ring operate trigger 28 are connected to the inputs of error development "and" circuit 54 while the right hand output of the check trigger 52 and the left hand output of the ring operate trigger 28 are connected to the inputs of error development "and" circuit 56. The outputs of the "or" circuits 42 and 44 are also respectively connected to the inputs of error development "and" circuit 58 and the odd-even "or" circuit 60. The output of the odd-even "or" circuit 60 is connected to one input of error development "and" circuit 62 while the right hand output of the nth trigger of the ring circuit 14 is connected to the remaining input of the "and" circuit 62. The outputs of error development "and" circuits 54, 56, 58 and 62 are coupled via error forwarding "or" circuit 64 to one input of error sampling "and" circuit 66 while the reset input of the check trigger 52 and the remaining input of the "and" circuit 66 are commonly connected to the input terminal 68. A sample and reset source (not shown) is connected to the input terminal 68 for applying a positive sampling pulse to error sampling "and" circuit 66. The trailing edge of the positive sampling pulse is utilized for turning "off" the check trigger 52. The output of the "and" circuit 66 is connected to the ERROR output terminal 70.

When ring circuit operation is called for, the ring operate trigger 28 is turned "on," in a manner as previously described, and a positive signal is applied from its right hand output via the RING OP line to condition the drive and error development "and" circuits 34 and 54 of a negative signal is applied from its left hand output via the NO RING OP line to decondition the "and" circuit 56. The next succeeding positive pulse applied to the input terminal 36 from the ring drive pulse source passes via the now conditioned drive "and" circuit 34 to the inverter 38 where it is inverted to a negative pulse and applied to the ring advance line 20. The first negative pulse on the ring advance line 20 is effective to turn "on" the trigger 16a which, in being turned "on," applies a positive signal from its right hand output via the odd "or" circuit 42 to the inverter 46 where it is inverted to a negative signal and applied to turn "on" the check trigger 52. The check trigger 52 in being turned "on," applies a negative signal from its left hand output to the remaining input of error development "and" circuit 54 and applies a positive signal from its right hand output to the remaining input of the "and" circuit 56. Thus, the "and" circuit 54 is deconditioned by the negative signal from the check trigger 52 and the "and" circuit 56 is deconditioned by the negative signal from the ring operate trigger 28 so that relatively negative signals are applied from the "and" circuits 54 and 56 via the "or" circuit 64 to decondition the "and" circuit 66. Now, a positive sample and reset pulse is applied via the input terminal 68 to both the "and" circuit 66 and the reset input of the check trigger 52. Since the "and" circuit 66 is deconditioned, the positive sample pulse does not pass through to the ERROR output terminal 70 and the trailing edge of the pulse is effective to reset the check trigger 38 in preparation for the next advance of the ring circuit 14. The next negative pulse applied to the ring advance line 20 is effective to turn "off" the first trigger 16a of the ring circuit 14 and to turn "on" the second trigger 16b of the ring circuit 14, in a manner as previously described. The trigger 16b, in being turned "on," applies a positive signal from its right hand output via the "or" circuit 44 to the inverter 48 where it is inverted to a negative signal to turn "on" the check trigger 52. Again, the check trigger 52 in being turned "on" applies a negative signal from its left hand output to one input of the "and" circuit 54 and applies a positive signal from its right hand output to one input of the "and" circuit 56. The ring operate trigger 28 still being "on" causes a negative signal to be applied from its left hand output via the NO RING OP line to the remaining input of the "and" circuit 56 and a positive signal from its right hand output via the RING OP line to the remaining input of the "and" circuit 54. Consequently, the "and" circuit 54 is again deconditioned by a negative signal from the check trigger 52 and the "and" circuit 56 is deconditioned by a negative signal from the ring operate trigger 28 so that relatively negative signals are applied from the "and" circuits 54 and 56 via the "or" circuit 64 to decondition the "and" circuit 66. Hence, the positive sample and reset pulse applied to the input terminal 68 is blocked from passing via the "and" circuit 66 to the ERROR output terminal 70 but the trailing edge thereof is effective to reset the check trigger 52 in preparation for the next advance of the ring circuit 14. Thus, it should be apparent, that so long as one and only one of the plurality of triggers 16 of the ring circuit 14 is turned "on" during a ring advance no error signal is produce at the ERROR output terminal 70.

One type of error that may occur is when none of the triggers of the ring circuit 14 is turned "on" during a ring operation. Under such circumstances, no positive signal is applied from the right hand outputs of any of the triggers of the ring circuit 14 to either of the "or" circuits 42 or 44 and, as a consequence thereof, the check trigger 52 remains in the "off" state. Under this condition, the check trigger 52 applies a positive signal from its left hand output to one input of the "and" circuit 54 while the ring operate trigger 28, which is still "on," applies a positive signal from its right hand output via the RING OP line to the remaining input of the "and" circuit 54 causing a positive signal to be passed via the "or" circuit 64 to condition the "and" circuit 66. Thus, when the positive sample pulse is applied to the input terminal 68, it passes via the now conditioned error sampling "and" circuit 66 to the ERROR output terminal 70 to signal that an error has occurred, that is, that none of the triggers of the ring circuit 14 have been turned "on."

Another type of error that may occur is when the ring circuit 14 double-advances during a ring operation. Thus, in the previous illustration, in which, the first trigger 16a of the ring circuit 14 is turned "off" and the trigger 16b of the ring circuit 14 is turned "on," let it be assumed that the trigger 16b is momentarily turned "on" but, that, due to some component failure, it resets to the "off" state permitting a negative signal to be applied from its right hand tapped output via the diode gate 18b to turn "on" the trigger 16c. The trigger 16b, in being momentarily turned "on," applies a positive signal via the "or" circuit 44 to the inverter 48 where it is inverted to a negative signal to turn "on" the check trigger 52. However, subsequently, when the trigger 16c is turned "on," it applies a positive signal from its right hand output via the "or" circuit 42 to the inverter 46 where it is inverted to a negative signal to turn "off" the check trigger 52. Under this condition, the check trigger 52 applies a positive signal from its left hand output to one input of the "and" circuit 54 while the ring operate trigger 28, which is still "on," applies a positive signal from its right hand output via the RING OP line to the remaining input of the "and" circuit 54 so that a positive signal is passed from the "and" circuit 54 via the "or" circuit 64 to condition the "and" circuit 66. Thus, when a positive sample pulse is applied to the input terminal 68, it passes via the now conditioned "and" circuit 66 to the ERROR output terminal 70 to signal that an error has occurred, that is, that the ring circuit 14 has advanced improperly producing a double spike during one pulse period.

Still another type of error that may occur is when a trigger of the ring circuit 14 is turned "on" when the ring circuit 14 is in a non-operative status. Referring now to FIG. 12 a timing diagram is shown of the various signals applied to the circuit in FIG. 1 when the ring circuit 14 is advanced one position for each predetermined number of ring drive pulses applied thereto. Thus, after the ring operate trigger 28 is first turned "on" to condition the "and" circuit 34, the next ring drive pulse applied to the input terminal 36 passes through to turn "on" the first trigger 16a of the ring circuit 14, in a manner as previously described, which, in being turned "on," applies a positive signal from its right hand output via the "or" circuit 42 to the inverter 46 where it is inverted to a negative signal to turn "on" the check trigger 52.

The check trigger 52 in being turned "on" applies a negative signal to one input of the "and" circuit 54 and applies a positive signal from its right hand output to one input of the "and" circuit 56. The ring operate trigger 28, in being "on," applies a negative signal from its left hand output via the NO RING OP line to the remaining input of the "and" circuit 56 and applies a positive signal from its right hand output via the RING OP line to the remaining input of the "and" circuit 54. Again, as described before, a positive sample pulse is applied via the input terminal 68 to the "and" circuit 66 to determine whether none of the triggers 16 of the ring circuit 14 have been turned "on" or that the ring circuit 14 has advanced improperly. If such an error had occurred, the "and" circuit 66 would be conditioned, in a manner as previously described, so that the positive sample pulse would be gated to the ERROR output terminal 70 to signal such error. If no error occurred, then, the "and" circuit 66 is deconditioned, in a manner as previously described, and the sample pulse is blocked from passing through to the ERROR output terminal 70. Also, the trailing edge of the sample pulse is effective to turn "off" the check trigger 52. Now, assuming no error occurred, the ring operate trigger 28 is turned "off" by the application of a negative pulse to the STOP input terminal 32. The ring operate trigger 28, in being turned "off," applies a negative signal from its right hand output to decondition the "and" circuit 34 to prevent any further ring drive pulses from passing through to the ring advance line 20. Additionally, the ring operate trigger 28 applies a positive signal from its left hand output via the NO RING OP line to condition the "and" circuit 56. Now, if due to some failure or noise pulse creeping in, one of the triggers 16 of the ring circuit 14 is turned "on," a positive signal is applied from its right hand output via either the "or" circuit 42 or the "or" circuit 44 to the inverters 46 and 48, respectively, or if the *n*th trigger is turned "on" to apply a positive signal from its right hand output to the inverter 50 where it is inverted to a negative signal to turn "on" the check trigger 52. The check trigger 52 in being turned "on," applies a positive signal from its right hand output via the now conditioned "and" circuit 56 and the "or" circuit 64 to condition the "and" circuit 66. Hence, the next succeeding positive sample pulse applied to the input terminal 68 passes via the now conditioned "and" circuit 66 to the ERROR output terminal 70 signaling that an error has occurred, that is, that one of the triggers of the ring circuit 14 has been turned "on" when the ring circuit 14 is in a non-operative status. Also, as before, the trailing edge of the sample pulse is effective to reset the check trigger 52 in preparation for a further checking operation. Thus, it should be apparent, that the checking arrangement up to the present time, is effective for determining whether none of the triggers have been turned "on," whether the ring circuit has advanced improperly or whether the ring circuit is operating when it should be in a non-operative status.

Still a further type of error that may occur is when more than one trigger of the ring circuit 14 is in the "on" state whereas, in fact, one and only one should be "on." Thus, in the first example, wherein the first trigger 16*a* of the ring circuit 14 is turned "off" and the trigger 16*b* of the ring circuit 14 is turned "on," let it be assumed, that, due to some error, the trigger 16*a* does not turn "off" but, instead, remains "on." The trigger 16*a*, in being in the "on" state, applies a positive signal from its right hand output via the "or" circuit 42 to condition the "and" circuit 58 so that now when the trigger 16*b* is turned "on," it applies a positive signal from its right hand output via the "or" circuit 44 and the now conditioned "and" circuit 58 and via the "or" circuit 64 to condition the "and" circuit 66. Hence, when the positive sample pulse is applied to the input terminal 68, it passes via the now conditioned "and" circuit 66 to the ERROR output terminal 70 to signal that an error has occurred, that is, either that two succeeding triggers of the ring circuit 14 are in the "on" state, as in the above example, or that an odd and even one of the triggers of the ring circuit 14 are in the "on" state.

A situation may occur in this type of error wherein two odd or two even ones of the triggers of the ring circuit 14 are in the "on" state and are simultaneously advanced down the ring circuit 14 without being detected by any of the arrangements previously described. For example, let it be assumed that the triggers 16*a* and 16*e* of the ring circuit 14 are in the "on" state. Consequently, a negative pulse applied to the ring advance line 20 causes the triggers 16*a* and 16*c* to be simultaneouly turned "off" and the triggers 16*b* and 16*d* to be simultaneously turned "on." Therefore, positive signals are simultaneously applied from the right hand outputs of the triggers 16*b* and 16*d* via the "or" circuit 44 to the inverter 48 where they are inverted to a negative signal which is applied to turn "on" the check trigger 52. The check trigger 52 in being turned "on," applies a negative signal from its left hand output to decondition the "and" circuit 54 while the ring operate trigger 28 in being "on" applies a negative signal from its left hand output via the NO RING OP line to decondition the "and" circuit 56. Furthermore, since none of the odd ones of the triggers of the ring circuit 14 are "on," a negative signal passes via the "or" circuit 42 to decondition the "and" circuit 58 while the *n*th trigger of the ring circuit 14 being "off" applies a negative signal from its right hand output to decondition the "and" circuit 62. Consequently, since the "and" circuits 54, 56, 58 and 62 are deconditioned, negative signals are applied therefrom via the "or" circuit 64 to decondition the "and" circuit 66 so that when the positive sample pulse is applied to the input terminal 68, it is blocked from passing through to the ERROR output terminal 70 to signal an error. Also the trailing edge of the positive sample pulse is effective to reset the check trigger 52 in preparation for the next advance of the ring circuit 14. In a similar manner, each time the ring circuit 14 advances, two odd or two even triggers are simultaneously turned "off" while two even or two odd triggers are simultaneously turned "on" causing the check trigger 52 to be turned "on" to decondition the "and" circuit 54, in a manner as previously described, while the ring operate trigger 28, in being "on" during ring operation, is effective to decondition the "and" circuit 56, in a manner as previously described. Also, since successive odd and even triggers are turned "on," successive negative signals are applied alternately from the "or" circuits 42 and 44 to decondition the "and" circuit 58 while the *n*th trigger of the ring circuit 14 in being "off" is effective to decondition the "and" circuit 62. Consequently, since the "and" circuits 54, 56, 58 and 62 are deconditioned with each advance of the ring circuit 14, negative signals are passed via the "or" circuit 64 to decondition the "and" circuit 66 so that the positive sample pulse applied to the input terminal 68 is blocked from passing through to the ERROR output terminal 70 to signal the error. However, when the *n*th trigger of the ring circuit 14 is turned "on" and one of the remaining ones of the triggers of the ring circuit 14, is simultaneously turned "on," whether it be an odd or even one, a positive signal is applied from the right hand output of the *n*th trigger to one input of the "and" circuit 62 while a positive signal is applied from the right hand output of the other one of the triggers which is turned "on" via either one of the "or" circuits 42 or 44 and via the "or" circuit 60 to the remaining input of the "and" circuit 62 causing a positive signal to be applied from the "and" circuit 62 via the "or" circuit 64 to condition the "and" circuit 66. Hence, when the positive sample pulse is applied to the input terminal 68, it passes via the now conditioned "and" circuit 66 to the ERROR output terminal 70 to signal that an error has occurred, that is, that two triggers of the ring circuit 14 are in the "on" state. Thus, though this type of error is not detected instantaneously, it will be detected upon the completion of one operative cycle of the ring circuit 14.

It should be apparent that the checking arrangement shown in FIG. 1 is applicable to both an open or closed ring, in which, one and only one trigger of the ring should be in the "on" state at any one instant of time and will signal an ERROR during ring operation whenever none of the triggers of the ring are turned "on," whenever the ring advances improperly or whenever more than one trigger of the ring is in the "on" state. Additionally, the checking arrangement for the ring circuit 14 will signal an ERROR when a trigger of the ring circuit 14 is turned "on" when the ring should be in a non-operative status. An indicator, such as a neon tube can be connected to the ERROR output terminal 70 causing the tube to glow whenever an error signal appears at the output terminal 70.

Also, it should be obvious that an advantage of the present invention is that it can be used to check a ring circuit having any number of stages without requiring additional circuitry for each additional stage of the ring. Furthermore, it should be apparent that the checking arrangement can be utilized for checking a decade counter, a decoded binary-decade counter or a decoder wherein a signal is produced on one and only one output line at any one instant of time.

Where there has been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited by the scope of the following claims.

What is claimed is:

1. A checking circuit for a ring having a drive input and a plurality of outputs including an $n$th output, successive drive signals applied to the input causing conditioning to advance from one to the next of successive outputs, comprising:

(a) control means for producing operation and no-operation signals and correspondingly allowing or inhibiting the application of drive signals to the ring;
(b) monitor means coupled to each ring output to produce monitor signals in response to ring signals;
(c) error development means coupled to and responsive to said monitor means and to the $n$th output to produce an error signal upon occurrence of each of the following:
  (1) conditioning of an output during a no-operation period
  (2) failure of an output to be conditioned during an operation period
  (3) double-advance of the ring
  (4) simultaneous conditioning of the $n$th output and another output.

2. A checking circuit for an $n$-stage ring having a drive input and a succession of stage outputs including a stage $n$ output, comprising:

(a) a RING OP trigger for producing RING OP or NO RING OP signals according to its set or reset condition respectively;
(b) a drive AND circuit coupled to said RING OP trigger and responsive to said RING OP signal for gating advance pulses from the drive input to the ring;
(c) odd monitor means coupled to and responsive to outputs of odd ring stages other than stage $n$ to provide odd monitor signals;
(d) even monitor means coupled to and responsive to outputs of even ring stages other than stage $n$ to provide even monitor signals;
(e) stage $n$ monitor means coupled to and responsive to the stage $n$ output to provide a stage $n$ monitor signal;
(f) a CHECK trigger, for producing a CHECK signal when set and a NO CHECK signal when reset, coupled to said odd monitor means, said even monitor means and said stage $n$ monitor means and responsive in binary fashion to monitor signals odd, even and stage $n$ whereby said CHECK trigger changes state upon any ring advance;
(g) first error development means, coupled to said RING OP trigger and to said CHECK trigger to produce a first error development signal upon conditioning by coincident RING OP and NO CHECK signals;
(h) second error development means, coupled to said RING OP trigger and to said CHECK trigger, to produce a second error development signal upon conditioning by coincident NO RING OP and CHECK signals;
(i) third error development means coupled to said odd monitor means and to said even monitor means, to produce a third error development signal upon conditioning by coincident odd and even monitor signals;
(j) fourth error development means coupled to stage $n$ and coupled via a logical OR to said odd monitor means and to said even monitor means to produce a fourth error development signal upon conditioning of stage $n$ and a coincident monitor signal odd or even; and
(k) reset means coupled to said CHECK trigger to reset said CHECK trigger and sample said error means.

3. A check for a ring having an input and a plurality of outputs including an $n$th output, successive drive signals applied to the input causing conditioning to advance from one to the next of successive outputs, comprising:

(a) control means to produce operation and no-operation signals and correspondingly to allow or to inhibit the application of drive signals to the ring input;
(b) monitor check means, connected to the outputs of the ring, to produce a pattern of monitor signals and a check signal in response to the outputs of the ring, the check signal indicating a ring advance of an odd number of stages; and
(c) error development means, coupled to said monitor check means and to said control means, to produce an error development signal upon coincident conditioning by a no-operation signal and a check signal.

4. A check circuit for an $n$-stage ring having a drive input and a succession of stage outputs including a stage $n$ output, comprising (a) a RING OP trigger for producing RING OP or NO RING OP signals according to its set or reset conditioning respectively;
(b) a drive AND circuit coupled to and responsive to said RING OP trigger and said RING OP signal for gating advance pulses from the drive input of the ring;
(c) odd monitor means coupled to and responsive to outputs of odd ring stages other than stage $n$ to provide odd monitor signals;
(d) even monitor means coupled to and responsive to outputs of even ring stages other than stage $n$ to provide even monitor signals;
(e) stage $n$ monitor means coupled to and responsive to the output of stage $n$ to provide a stage $n$ monitor signal;
(f) a CHECK trigger, for producing a CHECK signal when set or a NO CHECK signal when reset, coupled to said monitor means and responsive in binary fashion to monitor signals from said odd, even and stage $n$ monitor circuits whereby said CHECK trigger changes state upon each ring advance;
(g) an error development circuit coupled to said RING OP trigger and to said CHECK trigger and responsive to coincident NO RING OP and CHECK signals to produce an error development signal; and (*h*) reset means coupled to said CHECK trigger to reset said CHECK trigger.

5. A checker for a ring having an input and a plurality of outputs including an *n*th output, successive drive signals applied to the input causing conditioning to advance from one to the next of successive outputs, comprising:

(*a*) control means to produce operation and no-operation signals and correspondingly to allow or to inhibit the application of drive signals to the ring input;

(*b*) monitor check means, coupled to the outputs of the ring, to produce a pattern of monitor signals and a no-check signal in response to the outputs of the ring; and (*c*) error development means, coupled to said monitor check means and to said control means, to develop an error signal upon conditioning by coincident signals operation and no-check.

6. A checker for a ring having an input and a plurality of outputs and including an *n*th output, successive drive signals applied to the input causing conditioning to advance from one to the next of successive outputs, comprising:

(*a*) monitor means coupled to and responsive to each ring output to product a pattern of monitor signals; and (*b*) error development means coupled to and responsive to said monitor means for producing an error development signal upon double-advance of the ring.

7. A check circuit for an *n*-stage ring having drive input and a succession of stage outputs including a stage *n* output comprising:

(*a*) a RING OP trigger for producing RING OP or NO RING OP signals according to its set or reset condition respectively;

(*b*) a drive AND circuit coupled to said RING OP trigger and conditioned by the RING OP signal for gating drive signals from the drive input to the ring;

(*c*) odd monitor means coupled to and responsive to outputs of odd ring stages other than stage *n* to provide an odd monitor signal;

(*d*) even monitor means coupled to and responsive to outputs of even ring stages other than stage *n* to provide an even monitor signal;

(*e*) stage *n* monitor means coupled to and responsive to ring stage *n* to provide a stage *n* monitor signal;

(*f*) a CHECK trigger for producing a CHECK signal when set and a NO CHECK signal when reset, coupled to said odd monitor means, to said even monitor means and to said stage *n* monitor means and responsive in binary fashion to monitor signals odd, even and stage *n*, whereby said CHECK trigger changes state upon the monitor signal for each ring advance;

(*g*) error development means coupled to said RING OP trigger and to said CHECK trigger and responsive to coincident RING OP and NO CHECK signals to produce an error development signal; and (*h*) reset means coupled to said CHECK trigger to reset said CHECK trigger.

8. A checking circuit for an *n*-stage ring having a drive input and a succession of stage outputs including a stage *n* output, comprising:

(*a*) odd monitor means coupled to and responsive to outputs of odd ring stages other than stage *n* to provide odd monitor signals;

(*b*) even monitor means coupled to and responsive to outputs of even ring stages other than stage *n* to provide even monitor signals;

(*c*) error development means coupled to said odd monitor means, to said even monitor means and to stage *n*, conditionable by coincident signals stage *n* and odd monitor and conditionable by coincident signals stage *n* and even monitor to produce an error development signal.

References Cited in the file of this patent

UNITED STATES PATENTS

| | | |
|---|---|---|
| 2,685,683 | Holden et al. | Aug. 3, 1954 |
| 2,724,104 | Wild | Nov. 15, 1955 |
| 2,769,971 | Bashe | Nov. 6, 1956 |
| 2,844,721 | Minkow | July 22, 1958 |